Dec. 27, 1960     G. L. N. MEYER     2,966,252
INFEED CONVEYORS

Filed Dec. 29, 1955     9 Sheets-Sheet 2

Inventor:
George L. N. Meyer
By Eugene H. Simpson
Attorney

Dec. 27, 1960  G. L. N. MEYER  2,966,252
INFEED CONVEYORS
Filed Dec. 29, 1955  9 Sheets-Sheet 5

Inventor:
George L. N. Meyer
By: Fitzgerald Simpson
Attorney

Dec. 27, 1960

G. L. N. MEYER 2,966,252

INFEED CONVEYORS

Filed Dec. 29, 1955

Inventor:
George L. N. Meyer
By: Eugene W. Simpson
Attorney

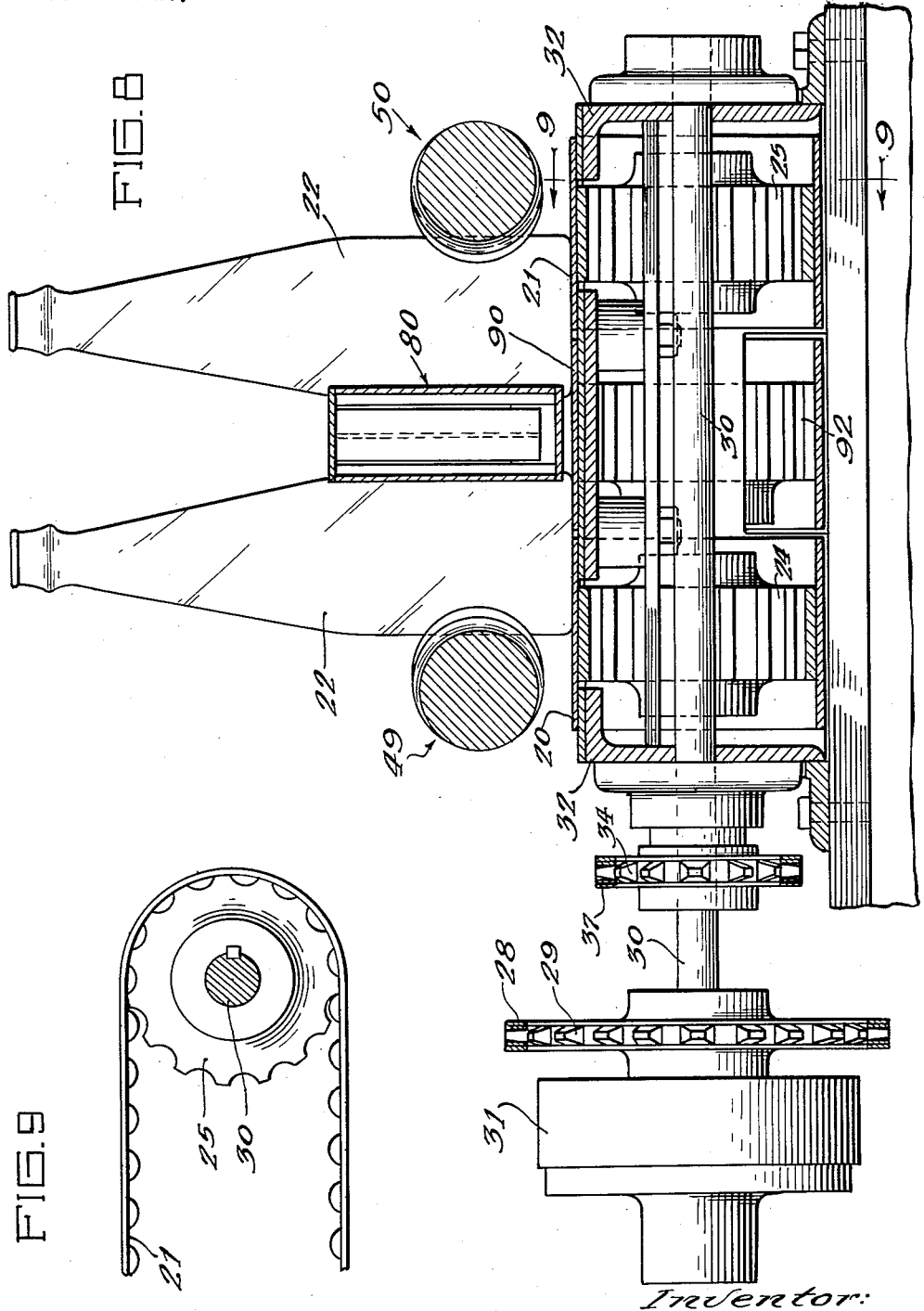

Dec. 27, 1960 G. L. N. MEYER 2,966,252
INFEED CONVEYORS
Filed Dec. 29, 1955 9 Sheets-Sheet 8

Inventor:
George L. N. Meyer
By Eugene H. Simpson
Attorney

Dec. 27, 1960  G. L. N. MEYER  2,966,252
INFEED CONVEYORS
Filed Dec. 29, 1955  9 Sheets-Sheet 9
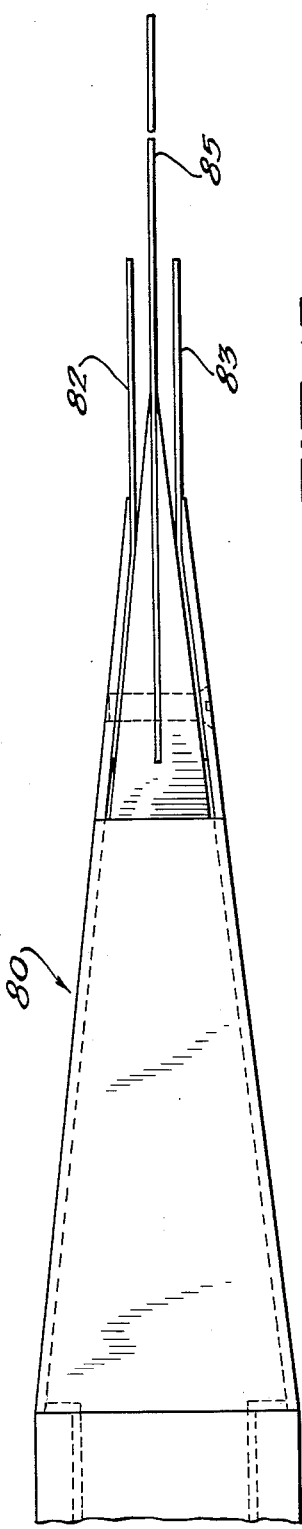
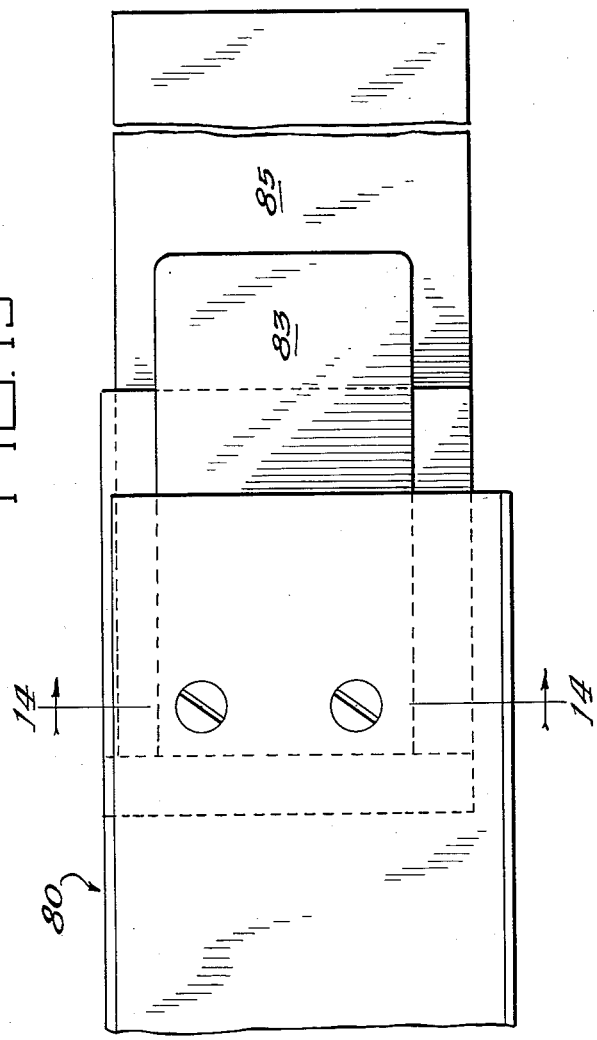
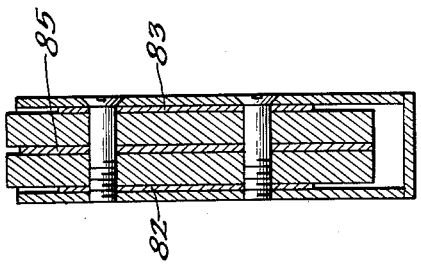
Inventor:
George L. N. Meyer
By: Eugene W. Simpson
Attorney

United States Patent Office 2,966,252
Patented Dec. 27, 1960

2,966,252

INFEED CONVEYORS

George L. N. Meyer, Milwaukee, Wis., assignor to Geo. J. Meyer Manufacturing Co., Cudahy, Wis., a corporation of Wisconsin Filed Dec. 29, 1955, Ser. No. 556,328

19 Claims. (Cl. 198—32)

This invention relates to a method and to an apparatus to transport bottles, or the like, at high speeds and in their vertical positions.

In conveyors designed to transport containers between adjacent machines on which successive operations are performed on the containers, such as washing and filling, the conveyors operate satisfactorily only up to a certain predetermined maximum speed. For bottles this speed is about three hundred and fifty bottles per minute. At speeds exceeding this maximum any space between bottles, such as would naturally occur from uneven loading of the bottles on the conveyor, permits the bottles to fall over onto their sides, resulting in a bottle jam which necessitates the complete shutdown of the machinery.

Due to the intermittent operation of bottle washing machines, the bottles have a tendency to enter the conveyor in groups with spaces between the groups, thus limiting the speed at which the conveyors can be operated.

Modern bottle filling machines fill four hundred and fifty or more bottles per minute, and hence it is necessary to provide a conveyor system which will transport that number of bottles between the bottle washing machine and the bottle filling machine, while maintaining all bottles in upright position.

It is, therefore, an object of the present invention to provide a bottle supply system for a bottle filling machine, or the like, which will supply bottles in a single line at greater speeds than those at which the bottles could normally be transported in a single line.

Another object is to provide a method of supplying bottles to a bottle filling machine, or the like, at speeds greater than those at which the bottles could normally be transported in vertical positions in a single line.

Another object of the invention is to provide a system to supply bottles to a bottle filling machine, or the like, in which vertical control of the bottles is maintained.

A further object is to provide a system to supply bottles to a bottle filling machine, or the like, in which the possibility of bottles falling over prior to entry onto the bottle filling machine is eliminated.

A further object is to provide a system to supply bottles to a bottle filling machine, or the like, in which the bottles may be combined from a plurality of rows traveling at one speed into a single row traveling at an increased speed, prior to entry into the filling machine.

A still further object is to provide a system to supply bottles to a bottle filling machine, or the like, in which both the forward velocity of the bottles and their vertical position is controlled prior to the entry of the bottles into the infeed screw of the filling machine.

A still further object of the invention is to provide a system of moving bottles, or the like, which may be adapted readily to either increase or decrease the lineal velocity of the bottles handled thereby.

Other objects will become apparent upon considering the following specification, which, when taken in conjunction with the accompanying drawings, illustrates a preferred form of the invention.

According to one aspect of the present invention the incoming bottles are fed from a plurality of conveyors through a plurality of accelerating means which increase the lineal velocity of the bottles while retaining strict vertical control, and combine the bottles into a single row at increased velocity prior to delivery thereof.

According to a second aspect the invention comprises the method of delivering bottles at high speed to a filling machine, or the like, by conveying the bottles toward the filling machine at relatively low speeds and in a plurality of rows, accelerating the bottles adjacent the filling machine while maintaining strict vertical control, and combining the plurality of rows into a single row while still retaining strict vertical control of each bottle.

In the drawings:

Fig. 1 is a plan view, partly in cross-section, showing the infeed end of the bottle combiner embodied in the present invention, as applied to a bottle filling machine, or the like;

Fig. 8 is an enlarged transverse cross-sectional view taken on the line 8—8 of Fig. 2, looking in the direction of the arrows;

Fig. 9 is a cross-sectional view taken on the line 9—9 of Fig. 8, looking in the direction of the arrows;

Fig. 12 is a plan view of the tapered nose showing the flexible deflector used between the combiner and the intake screw;

Fig. 13 is an elevational view of the tapered nose and deflector shown in Fig. 12; and Fig. 14 is a transverse cross-section taken on the line 14—14 of Fig. 13, looking in the direction of the arrows.

Figure 4:
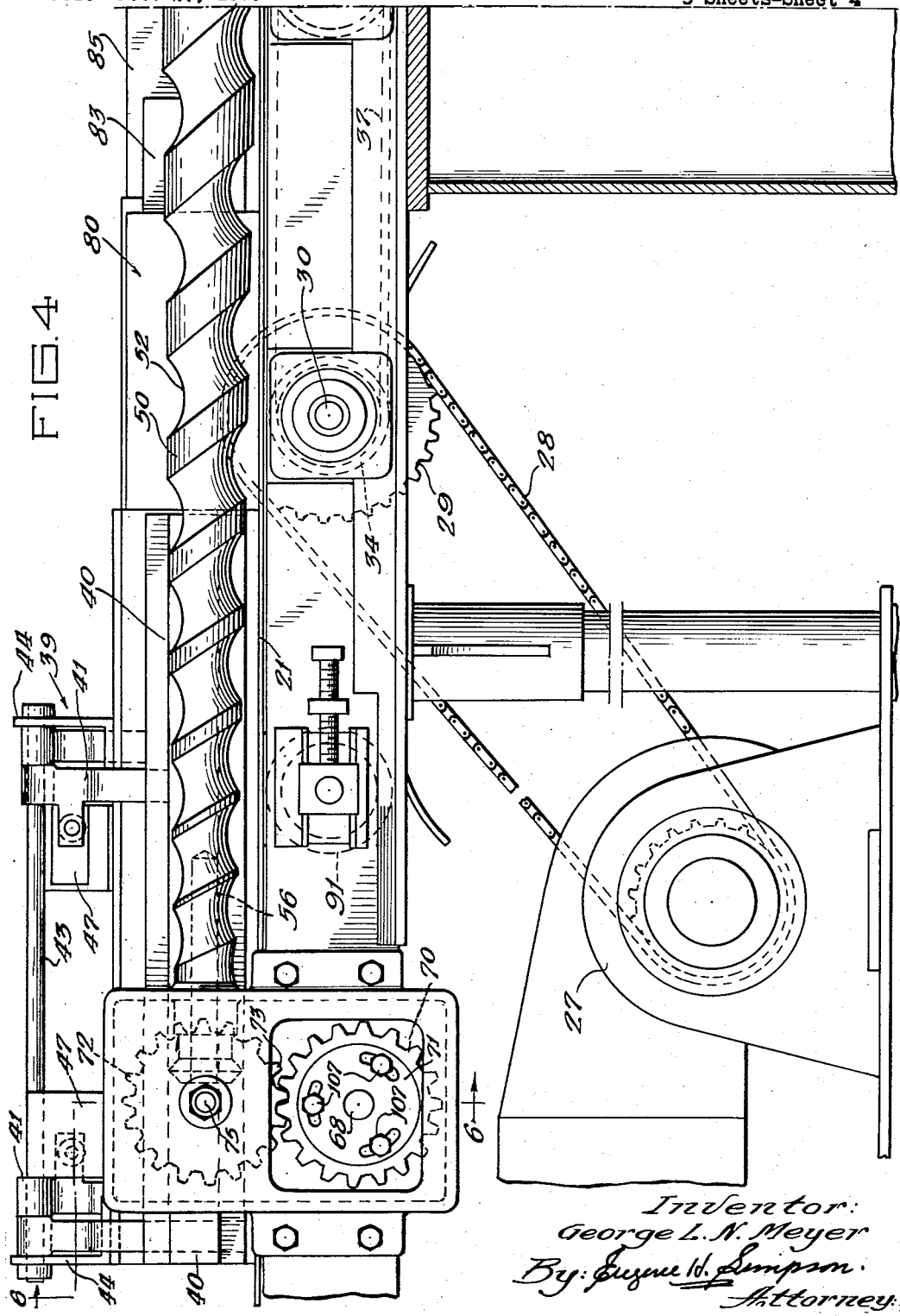
Fig. 4 is an elevational view of the intake end of the combiner, as shown in Fig. 1.

Referring to the drawings, the combiner is shown as comprising a double conveyor although it is to be understood that any number of conveyors may be employed depending upon the relative speeds of the bottles passing through the machine. The combiner shown comprises a pair of intake conveyors 20—21 running substantially although not necessarily parallel to each other, and transporting a constant supply of bottles 22 moving forward in an erect position. The conveyors 20—21 may be the endless chain and plate type. The conveyors 20—21 pass over driving sprockets 24—25 at the forward end of the conveyor flight (Figs. 2 and 8) and over similar idler sprockets (not shown) at the entrance to the conveyor. The sprockets 24—25 are driven from a motor gear-reduction unit 27, (Fig. 4) through a chain 28, which drives a sprocket 29 (Figs. 2, 4 and 8) mounted on an idler shaft 30. A wood block friction clutch 31 is interposed between the sprocket 29 and the shaft 30 to stop the conveyors 20—21 in the event of a bottle jam on the conveyor.

The idler shaft 30 (Fig. 8) is mounted between the side plates 32—32 of the combiner and between the flights of the conveyors 20—21 and carries a sprocket 34 driven from the sprocket 29 through the shaft 30.

The sprocket 34 drives a sprocket 36 (Fig. 2) through a chain 37, the sprocket 36 in turn drives the driving sprockets 24—25 of the conveyors 20—21 through their common shaft. The lineal speed of the conveyors 20—21 is somewhat over one-half the speed at which it is desired to deliver bottles to the filling machine so that any gaps in the line of bottles will be closed as the bottles approach the combiner.

Figure 1:
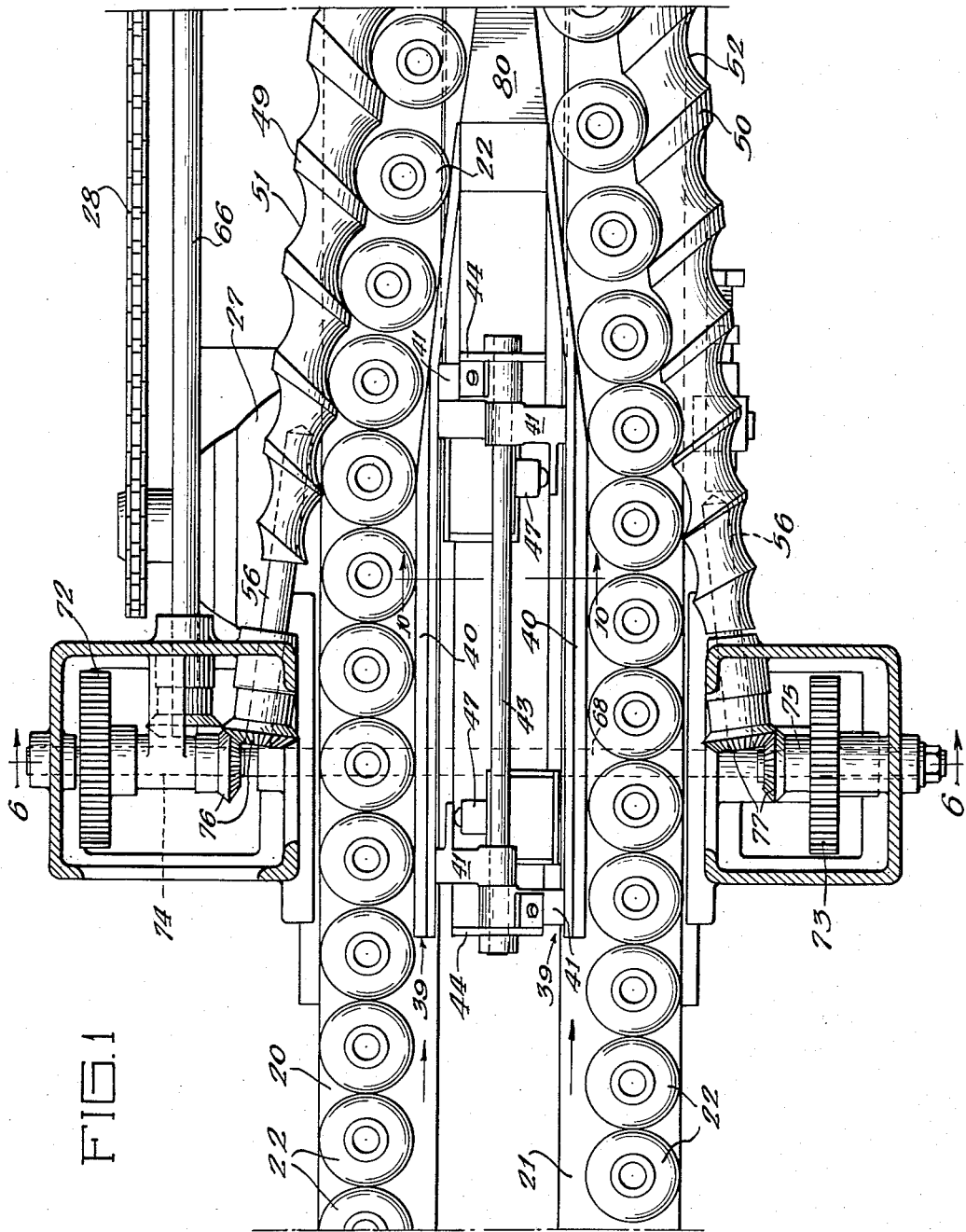
Figure 6:
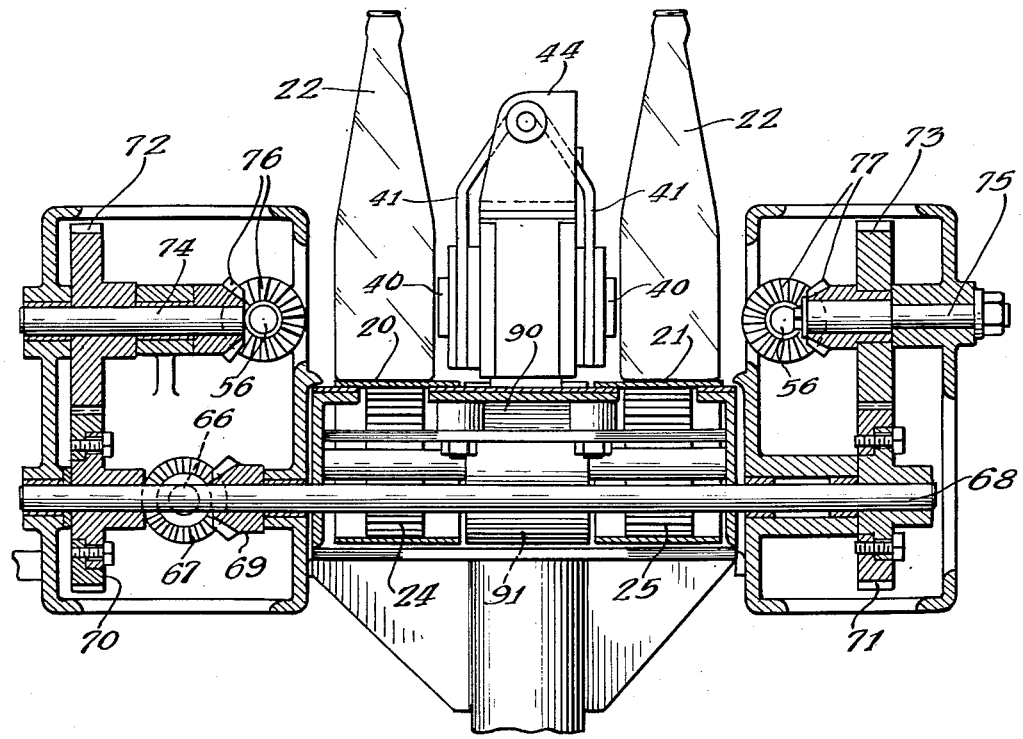
Fig. 6 is a transverse cross-sectional view taken on the line 6—6 of Figs. 1 and 4 and showing the safety gates and the drives for the combining screws.
Figure 7:
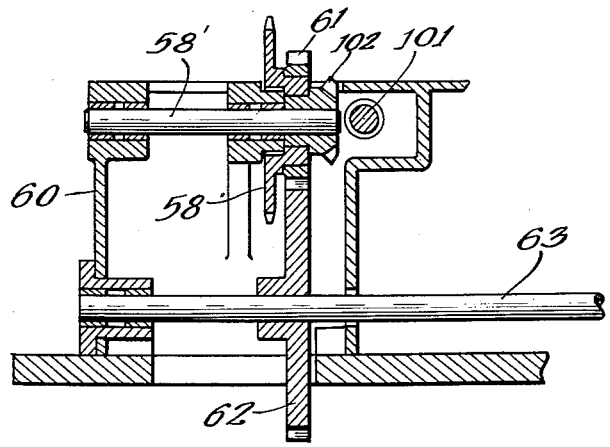
Fig. 7 is a transverse cross-sectional view taken on line 7—7 of Fig. 3, looking in the direction of the arrows.
Figure 10:
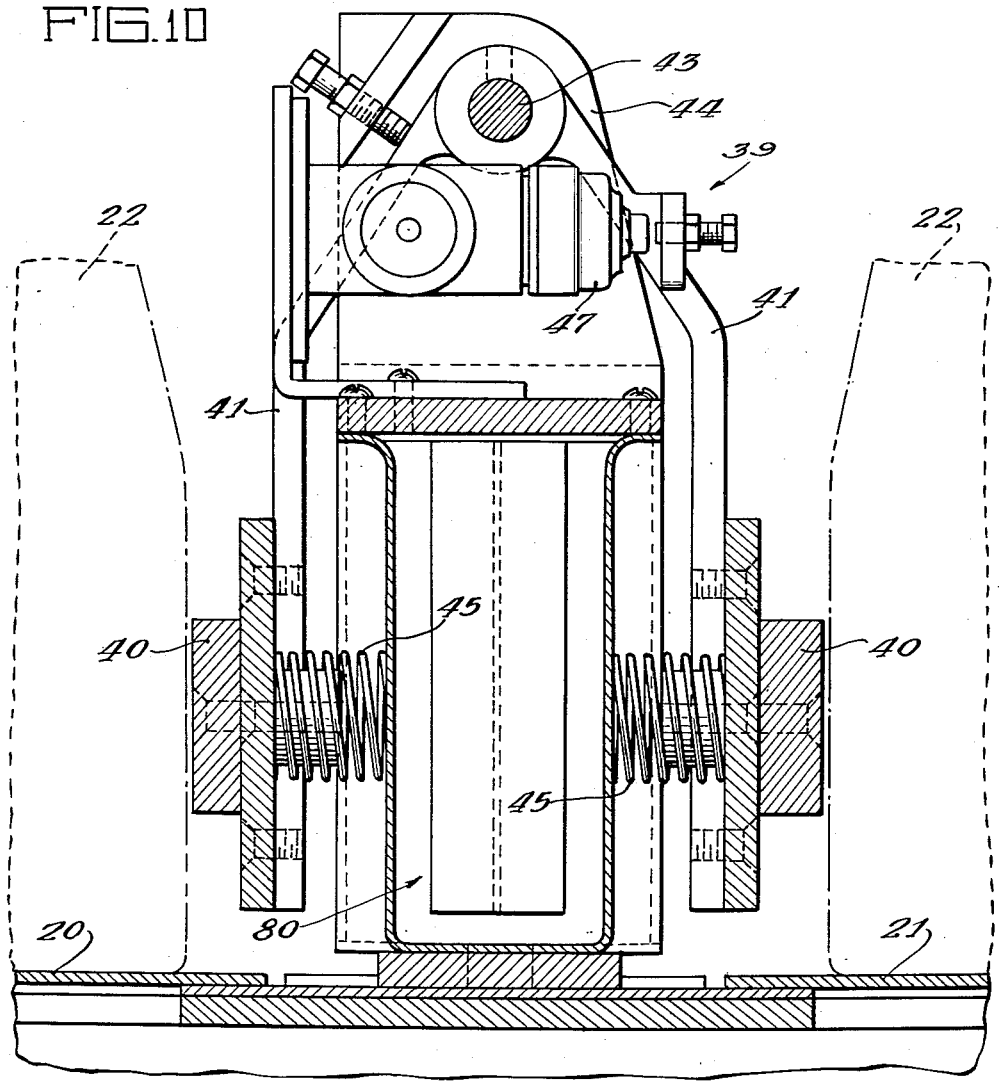
Fig. 10 is an enlarged transverse cross-sectional view taken on the line 10—10 of Fig. 1, looking in the direction of the arrows, and showing the construction of the double safety gates used in conjunction with the combining screws.
Figure 11:
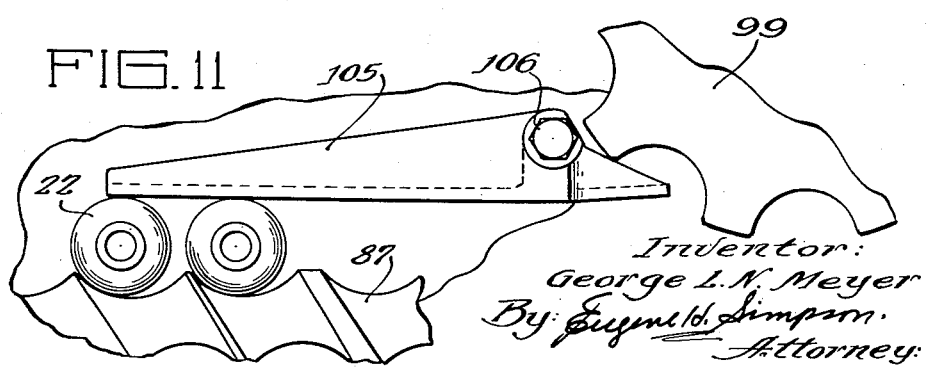
Fig. 11 is a plan view showing the safety gate used in connection with the intake screw of the bottle filling machine.

As the bottles approach the combiner on conveyors 20—21 they enter safety gates 39—39. The safety gates are shown in Figs. 1, 6 and 10. Referring to those figures and particularly to Figs. 1 and 10 the safety gates 39 each comprise a guide bar 40 carried by a lever 41, pivoted at its upper end to a single rod 43 which is supported above the conveyors 20—21 by frames 44—44. Springs 45 support the guide bars 40 and the levers 41 in proper position to guide the bottles into the combiner.

In the event a bottle becomes jammed in the entrance to the combiner the bottles 22 force the guide bars 40 inwardly, closing a micro-switch 47 to shut off the motor 27 and stop further movement of bottles into the combiner.

The bottles passing through the safety gates 39—39 are picked up by accelerating screws 49—50. The screws 49—50 converge inwardly toward each other and are cut with concave helical grooves 51—52 of constantly increasing pitch so that as the bottles are advanced in the helical grooves 51—52 the lineal velocity of the bottles is increased.

The accelerating screws are mounted at their forward ends on stub shafts 54—54 carried by brackets 55—55 and at their entrance ends on power shafts 56—56. The drive of the two accelerating screws is obtained from the main motor of the bottle filling machine or other suitable source. Referring to Figs. 1, 3, 4, 5 and 6, the filling machine motor drives a sprocket 58 through a chain 59, the sprocket 58 being carried by a shaft 58' journalled in the base 60 of the filling machine. The sprocket drives a spur gear 61. The gear 61 drives a spur gear 62 which is keyed to a shaft 63. The shaft 63 drives a pair of bevel gears 64—65 (Figure 3) which in turn drive a shaft 66. The shaft 66 drives a bevel gear 67 (Figs. 1 and 6) which drives a shaft 68 through the mating bevel gear 69.

The shaft 68 extends across the combiner between the flights of both conveyors 20 and 21, and carries adjustable spur gears 70 and 71 on the opposite ends thereof. The spur gears 70 and 71 drive gears 72—73 mounted on stub shafts 74—75. The gears 72—73 drive mating bevel gears 76—76 and 77—77 which in turn drive the shafts 56—56 to drive the accelerating screws 49—50.

The helical grooves 51—52 of the accelerating screws 49 and 50 are offset 180° so that as the screws rotate they advance the bottles and the bottles separate longitudinally (due to the increasing pitch) and move transversely toward each other so that the bottles arrive at the junction of the screws and alternately enter a single line of bottles which is delivered from the two accelerating screws 49—50 to a single infeed timing screw 78.

It will be noted that once the bottles enter the accelerating screws they are controlled by the screws 49—50 in lineal velocity and are under perfect control vertically so that they cannot then tip over to jam the machine. This control is made possible by the confining of the bottles between the helical grooves 51 and 52 and the walls of the safety gates 39. The bottle control is maintained past the end of the safety gates 39 by a tapered nose 80 secured to the forward frame 44. The nose 80 is best seen in Figs. 2, 12, 13 and 14.

Referring to those figures it will be seen that as the nose tapers to a point, it serves to hold the bottles in the helical grooves and thus retain rigid vertical control of the bottles and prevent their tipping over as well as maintaining lineal control.

Figure 2:
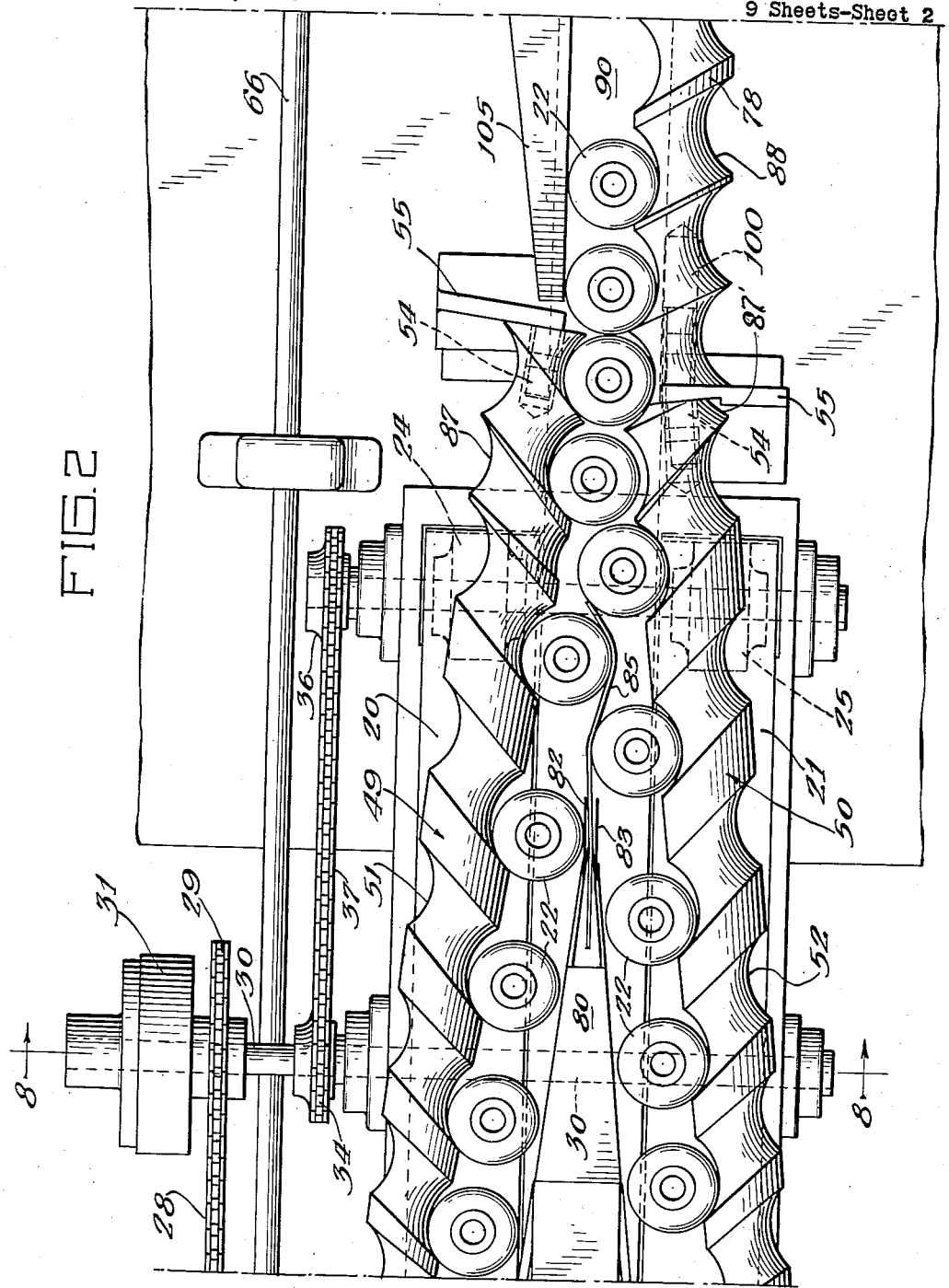
Fig. 2 is a continuation of the plan view of the bottle combiner, shown in Fig. 1, and shows the transfer of the bottles from the accelerating screws into the infeed screw of a bottle filling machine.

As the bottles approach the point of the nose the control of the bottles is assumed by a pair of spring steel plates 82—83. The plates 82—83 flex under the pressure of the bottles and deliver the bottles to a flexible plastic strip 85 which continues to urge the bottles into the grooves 51—52 and thus retains both lateral and vertical control of the bottles until they leave the end of the plastic strip 85 and merge into a single line, as seen in Fig. 2.

The plastic strip 85 is made of a flexible plastic which is sufficiently rigid to retain the bottles in their respective grooves and sufficiently flexible to bend between the bottles as the bottles advance. It is also desirable that the plastic will not crack or split under the repeated flexing and that it have a low co-efficient of friction.

The plastic made by E. I. Du Pont de Nemours Co., Inc., and sold under the trade name of Teflon, which is a polytetrafluoroethylene, has been found to be satisfactory. Besides the above properties, Teflon is not affected by acids, alkalies or organic solvents and is inert to metal contact. While Teflon has been found to be suitable for this plastic strip other plastics possessing the above properties may also be used for this purpose.

As the bottles leave the end of the Teflon strip 85 they have been separated sufficiently by the increasing pitch of the helical groove 51 so that the bottles from the conveyor 21 may be interspersed between the bottles coming from the conveyor 20. At this point a second helical groove 87 is cut in the screw conveyor 49 between the sides of the grooves 51, and a similar groove 87' is cut in the conveyor 50 between the sides of the grooves 52 therein, so that as the bottles from the conveyors 20 and 21 merge in a single line the groove 87 holds the bottles in the groove 52, and the helical groove 87' retains the bottles from the conveyor 20 in the groove 51, thus the grooves 87 and 87' replace the flexible strip 85 in maintaining control of the bottles adjacent the junction of the screw conveyors 49 and 50.

As the bottles in single file pass the ends of the conveyors 49—50 they enter the infeed conveyor 78. The conveyor 78 has a continuous helical groove 88 (Fig. 2) cut therein with a constantly increasing pitch. The bottles as they enter the conveyor 78 are received in the groove 88 and are propelled forward therein by the rotation of the conveyor 78. The bottles 22 are retained in the groove 88 by a safety gate 105 which is pivoted to the machine base at 106. The groove 88 because of its constantly increasing pitch increases the velocity of the bottles 22 and times them properly as they enter a star wheel 99.

Figure 3:
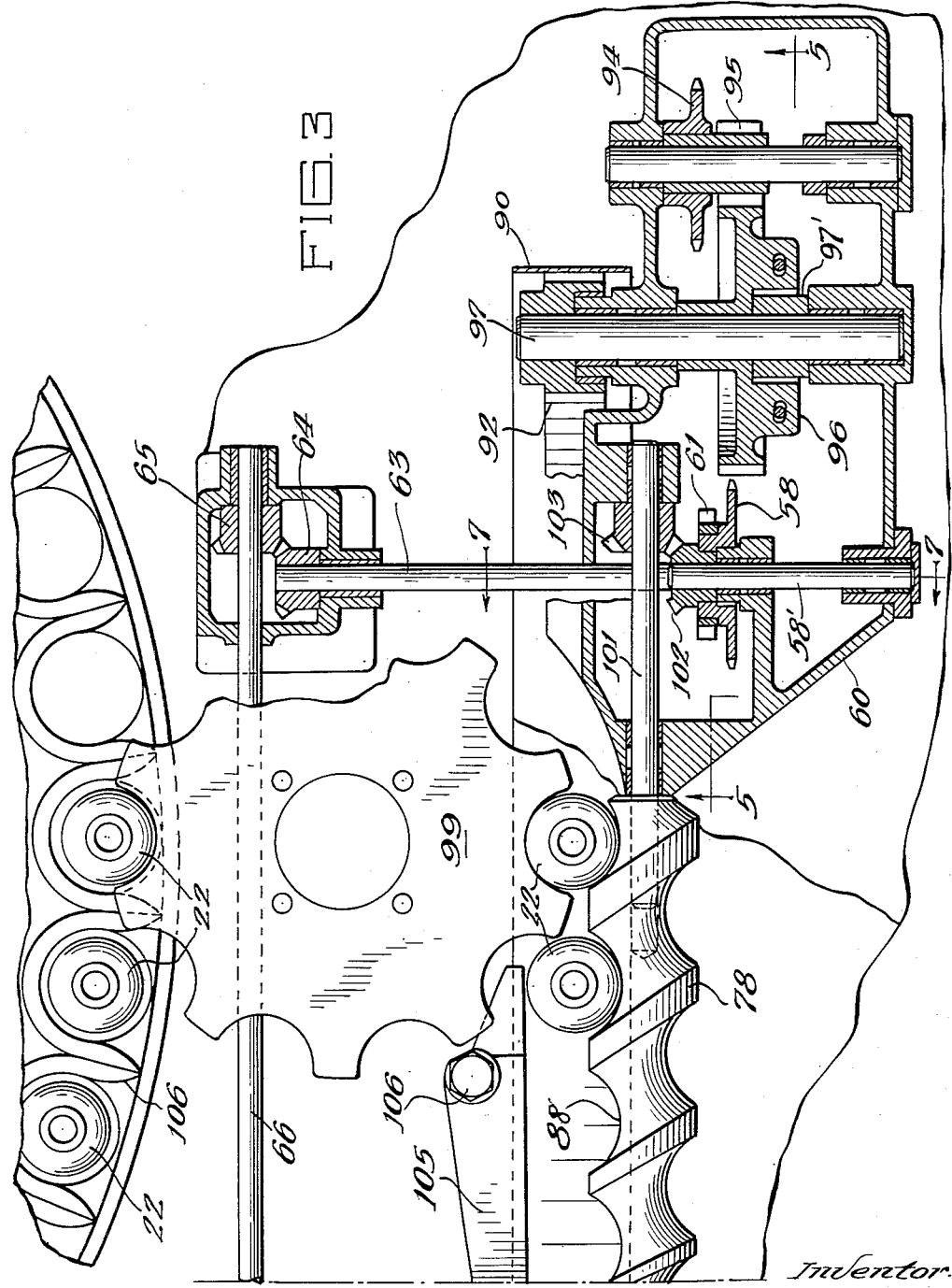
Fig. 3 is a continuation of the plan view of Figs. 1 and 2, showing the intake screw supplying bottles through the intake star wheel to the stirrups of the bottle washing machine, parts of this figure being broken away to illustrate the drive mechanism of the machine.

The bottles in moving diagonally across the conveyors 20—21 move off the conveyors 20—21 and onto a central plate conveyor 90 which is carried between an idler sprocket 91 (Fig. 4) and a driving sprocket 92 (Fig. 3). The conveyor 90 travels at approximately the same velocity as that of the bottles entering the filling machine, or approximately twice the velocity of the conveyors 20—21.

The conveyor 90 is driven from the filling machine motor or other suitable source by a chain 93 (Fig. 5) which drives a sprocket 94 (Figs. 3 and 5) which drives a pinion 95. The pinion 95 drives a gear 96 which drives the driving sprocket 92 through the common shaft 97. A friction clutch 97' is interposed between the gear 96 and the shaft 97 to provide for stoppages in the bottle line.

Figure 5:
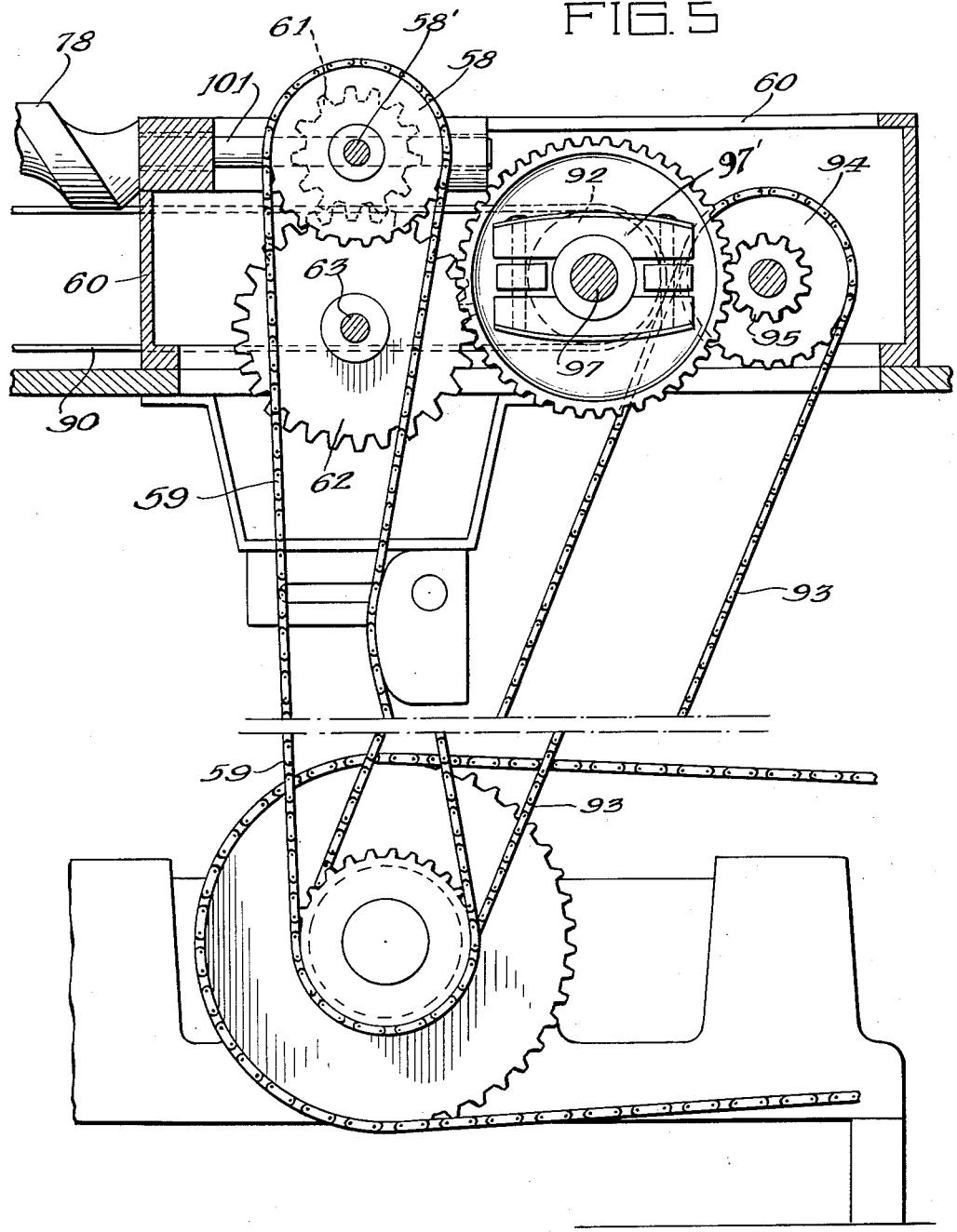
Fig. 5 is an elevational cross-sectional view taken on the line 5—5 of Fig. 3, looking in the direction of the arrows.

The infeed screw 78 is mounted above the conveyor 90 between a stub shaft 100 carried by the bracket 55 (Fig. 2) and a drive shaft 101 (Figs. 3 and 5). Power to operate the infeed screw 78 is obtained from the same source as for the accelerating screws 49—50 and is carried through the chain 59 which drives the sprocket 58 (Fig. 5). The sprocket 58 drives a pair of bevel gears 102—103 (Fig. 3) which drive the shaft 101.

The bottles are retained under strict vertical and horizontal control between the infeed screw 78 and a safety gate 105. The safety gate is pivoted at 106 (Fig. 3) to swing out in the event a bottle becomes jammed to stop the machine.

From the infeed screw the bottles pass into the star wheel 99 which delivers the bottles to the stirrups 106' of the bottle filling machine.

In order that the accelerating screws 49—50 may be timed properly so as to deliver bottles correctly to the infeed screw 78, the gears 70—71 (Figs. 4 and 6) are made adjustable by having adjustable gear rims secured to the gear hubs by machine screws 107, or the like.

Should speeds of bottle delivery in excess of the capacity of the presently illustrated two-accelerating-screw machine be required the principles set forth herein can be adapted readily to three or more accelerating screws to increase the machine capacity without involving invention.

While the foregoing combiner has been illustrated and described in connection with a bottle filling machine it is obvious that it may be used also in any situation where there is the problem of transporting bottles, or the like, at very high speeds, and it will likewise be understood that various changes in size, shape and arrangement of parts may be made in the apparatus shown without departing from the spirit of the invention or the scope of the subjoined claims.

That which is claimed as new and is desired to be secured by United States Letters Patent is:

1. In an infeed conveyor for a bottle filler, or the like, a first conveyor adapted to transport bottles in a vertical position in a single line toward the filler; a first screw conveyor having a continuous groove therein with a constantly increasing pitch, said screw conveyor receiving bottles in their upright position from said first conveyor, assuming both vertical and lateral control of the bottles and doubling the velocity thereof; a second conveyor adapted to transport bottles in vertical position in a single line toward the filler; a second screw conveyor having a continuous groove therein with a constantly increasing pitch, said second screw conveyor converging toward said first screw conveyor and receiving bottles in their upright position from said second conveyor, assuming both vertical and lateral control of the bottles and doubling the velocity thereof; and a second groove in each of said screw conveyors adapted to receive bottles from the groove of the other said screw conveyor and advance the bottles in a single accelerated line for delivery to a desired point.

2. In an infeed conveyor for a bottle filler, or the like, a first plate conveyor adapted to transport bottles toward the filler in a vertical position and in a single line; a first single screw conveyor having a continuous helical groove therein with a constantly increasing pitch, said screw conveyor receiving bottles in said groove from said first conveyor; means to rotate the screw conveyor to advance the bottles in the grooves; means, including a safety gate and a flexible member carried from said safety gate, to maintain the bottles in the groove as they advance therein; a second plate conveyor adapted to transport bottles toward the filler in a vertical position and in a single line; a second screw conveyor having a continuous helical groove therein with a constantly increasing pitch, said second screw conveyor converging toward said first screw conveyor and receiving bottles in their upright position from said second plate conveyor to increase the velocity thereof; means to rotate said last named screw conveyor; and means directing bottles from both said screw conveyors into a single line for delivery to the filler.

3. In an infeed conveyor for a bottle filler, or the like, a first plate conveyor adapted to transport bottles toward the filler in vertical position and in a single line, a first single screw conveyor having a continuous helical groove therein with a constantly increasing pitch, means to rotate said screw conveyor to effect accelerating movement to bottles in said groove, said screw conveyor receiving bottles in said groove from said first plate conveyor, means including a safety gate to retain the bottles in the groove of the screw conveyor during a portion of their travel therein, a second plate conveyor adapted to transport bottles toward the filler in vertical position and in a single line, a second single screw conveyor converging toward said first single screw conveyor, said second single screw conveyor having a continuous helical groove therein with a constantly increasing pitch, means to rotate said second screw conveyor to effect accelerating movement of bottles in the groove, said second screw conveyor receiving bottles in said groove from said second plate conveyor, means including a safety gate to retain the bottles in the groove of the second screw conveyor during a portion of their travel therein, and means including a flexible strip to retain the bottles in both screw conveyors during a portion of their travel therein, whereby the bottles merge into a single line adjacent the end of the screw conveyors.

4. In an infeed conveyor for a bottle filler, or the like, a first plate conveyor adapted to transport bottles toward the filler in vertical position and in a single line, a first single screw conveyor having a continuous helical groove therein with a constantly increasing pitch, means to rotate said screw conveyor to effect accelerating movement to bottles in said groove, said screw conveyor receiving bottles in said groove from said first plate conveyor, means including a safety gate to retain the bottles in the groove of the screw conveyor during a portion of their travel therein, a second plate conveyor adapted to transport bottles toward the filler in vertical position and in a single line, a second single screw conveyor converging toward said first single screw conveyor, said second single screw conveyor having a continuous helical groove therein with a constantly increasing pitch, means to rotate said second screw conveyor to effect accelerating movement of bottles in the groove, said second screw conveyor receiving bottles in said groove from said second plate conveyor, means including a safety gate to retain the bottles in the groove of the second screw conveyor during a portion of their travel therein, a second helical groove cut in the first screw conveyor adjacent the end thereof to retain bottles in the second screw conveyor, and a second helical groove cut in said second screw conveyor adjacent the end thereof to retain the bottles in the first conveyor whereby the bottles merge into a single line adjacent the end of the screw conveyors.

5. In an infeed conveyor for a bottle filler, or the like, a first plate conveyor adapted to transport bottles toward the filler in a vertical position and in a single line; a first single screw conveyor having a continuous helical groove therein with a constantly increasing pitch, said screw conveyor receiving bottles in said groove from said first conveyor; means to rotate the screw conveyor to advance the bottles in the groove; means, including a safety gate and a flexible member carried from said safety gate, to maintain the bottles in the groove as they advance therein; a second plate conveyor adapted to transport bottles toward the filler in a vertical position and in a single line; a second screw conveyor having a continuous helical groove therein with a constantly increasing pitch, said second screw conveyor converging toward said first screw conveyor and receiving bottles in their upright position from said second plate conveyor to increase the velocity thereof; means to rotate said last named screw conveyor; and means directing bottles from both said screw conveyors into a single line for delivery to the filler.

6. In a mechanism for arranging articles in the manner described, a first conveyor structure including article supporting means and an article movement-controlling helical conveyor element, said conveyor element having at least one helical thread extending its entire length and a second helical thread arranged intermediate the helices of said first mentioned helical thread and from one end of said conveyor element to a point intermediate its length, and a second conveyor structure arranged to cooperate with at least one of the threads on the portion of said helical conveyor element having both of said first and second helical threads.

7. A mechanism of the character described in claim 5 wherein said helical conveyor element comprises a single substantially cylindrical member.

8. A mechanism of the character described in claim 5 wherein said second conveyor structure includes means to receive and space articles so that the articles may be interposed between articles traveling on said first conveyor structure.

9. A mechanism of the character described in claim 5 wherein said article supporting means of said first conveyor structure receives and positions articles in spaced relationship with each other at the end of said helical conveyor element having only the first helical thread, and said second conveyor structure delivers articles to the second helical thread of said helical conveyor element intermediate articles traveling in said first helical thread.

10. A mechanism of the character described in claim 5 wherein said second conveyor structure includes a helical conveyor element having a helical thread extending its entire length, the helical thread of said second conveyor element being in phase with the second helical thread of said first mentioned helical conveyor element.

11. A mechanism of the character described in claim 8 wherein the helical conveyor element of said first conveyor structure comprises a single substantially cylindrical member.

12. In a mechanism for arranging articles in the manner described, a first conveyor structure for conveying articles in a row, a second conveyor structure for conveying articles in a row, said second conveyor structure converging toward and terminating adjacent said first conveyor structure at a point of junction, said first conveyor structure including an article movement-controlling helical conveyor element, said helical conveyor element having a helical thread extending through its entire length and adapted to receive and control movement of articles, said helical conveyor element also having a second helical thread arranged intermediate the helices of said first mentioned helical thread and extending from a point intermediate its ends and adjacent the junction of said first and second conveyor structures to one of its ends, said second conveyor structure also including an article movement-controlling helical conveyor element, the helical conveyor element of said second conveyor structure having a helical thread extending its entire length, means to drive the helical conveyor element of said first conveyor structure in synchronism with the helical conveyor element of said second conveyor structure so that the helical thread of the helical conveyor element of the second conveyor structure is in phase with the second helical thread of the helical conveyor element of the first conveyor structure.

13. A mechanism of the character described in claim 12 including means provided at the point of junction of said first and second conveyor structures for alternately cooperating with the helical conveyor elements of said first and second conveyor structures, said means operable in synchronism with the rotation of the helical conveyor elements of said first and second conveyor structures.

14. In a mechanism for arranging articles in the manner described, a first conveyor structure including article supporting means and an article movement-controlling helical conveyor element, said helical conveyor element having a first helical thread extending its length for conveying an article and a second helical thread interposed between the helices of said first helical thread for conveying another article, and a second conveyor structure arranged to cooperate with said second helical thread.

15. A mechanism of the character described in claim 14 wherein said second conveyor structure includes an article movement-controlling helical conveyor element having a helical thread for engaging articles, means to rotate the helical conveyor elements of said first and second conveyor structures in timed relationship with each other so that the second helical thread of the helical conveyor element of said first conveyor structure rotates in synchronism with the thread of the helical conveyor element of said second conveyor structure.

16. In a mechanism of the character described, a first conveyor element, a second conveyor element, and means associated with one of said conveyor elements to position articles with respect to at least one of said conveyor elements, said means including a first series of pockets spaced apart a predetermined pitch for transferring an article, a second series of pockets spaced apart by the same pitch for transferring another article, a pocket of the first series being interposed between two adjacent pockets of the second series and means associated with the other of said conveyor elements and cooperating with one of said series of pockets.

17. An infeed conveyor for a bottle filler or the like comprising, a first screw conveyor having a continuous groove therein with a constantly increasing pitch, said screw conveyor receiving bottles in their upright position, assuming both vertical and horizontal control of the bottles, while increasing the velocity thereof, a second screw conveyor converging toward said first screw conveyor, said second screw conveyor receiving bottles in their upright position, assuming both vertical and horizontal control of the bottles, while increasing the velocity thereof, means to deliver the control of each of the bottles in each of said lines from one screw conveyor to both said screw conveyors, and means to deliver the bottles in single line to the filler.

18. An infeed conveyor for a bottle filler or the like comprising, a first screw conveyor having a continuous groove therein with a constantly increasing pitch, said screw conveyor receiving bottles in their upright position, assuming both vertical and horizontal control of the bottles, while increasing the velocity thereof, a second screw conveyor converging toward said first screw conveyor, said second screw conveyor receiving bottles in their upright position, assuming both vertical and horizontal control of the bottles, while increasing the velocity thereof, a flexible strip to deliver the control of each of the bottles in each of said lines from one screw conveyor to both of said screw conveyors, and means to deliver the bottles in single line to the filler.

19. An infeed conveyor for a bottle filler or the like comprising, a first screw conveyor having a continuous groove therein with a constantly increasing pitch, said screw conveyor receiving bottles in their upright position, assuming both vertical and horizontal control of the bottles, while increasing the velocity thereof, a second screw conveyor converging toward said first screw conveyor, said second screw conveyor receiving bottles in their upright position, assuming both vertical and horizontal control of the bottles, while increasing the velocity thereof, a flexible strip supported between the screw conveyors to deliver the control of each of the bottles in each of said lines from one screw conveyor to both said screw conveyors, and means to deliver the bottles in single line to the filler.

References Cited in the file of this patent

UNITED STATES PATENTS

| | | |
|---|---|---|
| 2,535,859 | McPherson | Dec. 26, 1950 |
| 2,801,650 | Breeback | Aug. 6, 1957 |